(12) United States Patent
Si et al.

(10) Patent No.: US 12,372,632 B2
(45) Date of Patent: Jul. 29, 2025

(54) RANGING METHOD AND DEVICE

(71) Applicant: VIVO MOBILE COMMUNICATION CO.,LTD., Guangdong (CN)

(72) Inventors: Ye Si, Guangdong (CN); Huaming Wu, Guangdong (CN); Xueming Pan, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 632 days.

(21) Appl. No.: 17/668,882

(22) Filed: Feb. 10, 2022

(65) Prior Publication Data

US 2022/0163647 A1    May 26, 2022

Related U.S. Application Data

(63) Continuation of application No. PCT/CN2020/103573, filed on Jul. 22, 2020.

(30) Foreign Application Priority Data

Aug. 12, 2019 (CN) .......................... 201910741403.4

(51) Int. Cl.
 *G01S 11/02* (2010.01)
(52) U.S. Cl.
 CPC .................................. *G01S 11/02* (2013.01)
(58) Field of Classification Search
 CPC ............................................. G01S 11/02
 USPC ........................................ 370/336; 342/118
 See application file for complete search history.

(56) References Cited

U.S. PATENT DOCUMENTS

| | | |
|---|---|---|
| 11,150,339 B2 | 10/2021 | Dees et al. |
| 11,218,980 B2 | 1/2022 | Aldana |
| 11,343,056 B2 | 5/2022 | Liang et al. |
| 2003/0174086 A1 | 9/2003 | Hirt |
| 2006/0133556 A1 | 6/2006 | Sarkar |
| 2007/0110126 A1 | 5/2007 | Sekiguchi et al. |

(Continued)

FOREIGN PATENT DOCUMENTS

| | | |
|---|---|---|
| CN | 1717593 A | 1/2006 |
| CN | 101558586 B | 12/2013 |

(Continued)

OTHER PUBLICATIONS

Notice of hearing for the Indian Patent Application No. 202247009256 issued by the Indian Intellectual Property Office on Apr. 3, 2024.

(Continued)

*Primary Examiner* — Bo Fan
(74) *Attorney, Agent, or Firm* — IP & T GROUP LLP

(57) ABSTRACT

A ranging method includes: sending a first signal, where a time at which the first signal is sent from a first UE is a first time; receiving a second signal sent by a second UE, where a time at which the second signal reaches the first UE is a second time; and determining a distance between the first UE and the second UE according to the first time, the second time, and a first time difference, where the first time difference is a difference between a third time at which the second UE sends the second signal and a fourth time at which the second UE receives the first signal.

20 Claims, 7 Drawing Sheets

(56) References Cited

U.S. PATENT DOCUMENTS

| | | | |
|---|---|---|---|
| 2010/0157933 A1* | 6/2010 | Park | H04W 56/0005 370/336 |
| 2010/0172339 A1 | 7/2010 | Duan et al. | |
| 2014/0057655 A1 | 2/2014 | Lee | |
| 2017/0131382 A1 | 5/2017 | He et al. | |
| 2018/0098299 A1 | 4/2018 | Chae | |
| 2018/0219596 A1 | 8/2018 | He et al. | |
| 2022/0163647 A1 | 5/2022 | Si et al. | |

FOREIGN PATENT DOCUMENTS

| | | | |
|---|---|---|---|
| CN | 103675800 | A | 3/2014 |
| CN | 103703386 | A | 4/2014 |
| CN | 105683774 | A | 6/2016 |
| CN | 106375950 | A | 2/2017 |
| CN | 107343297 | A | 11/2017 |
| CN | 107409387 | A | 11/2017 |
| CN | 108291960 | A | 7/2018 |
| CN | 108964867 | A | 12/2018 |
| CN | 109151796 | A | 1/2019 |
| CN | 109217998 | A | 1/2019 |
| JP | 2009150872 | A | 7/2009 |
| JP | 2015167284 | A | 9/2015 |
| JP | 2018534838 | A | 11/2018 |
| WO | 2018090181 | A1 | 5/2018 |
| WO | 2021027515 | A1 | 2/2021 |

OTHER PUBLICATIONS

Office Action for the Vietnamese Patent Application No. 1-2022-01091 issued by the Vietnamese Intellectual Property Office on Aug. 28, 2024.

International Search Report and Written Opinion of International Application No. PCT/CN2020/103573 issued by the Chinese Patent Office on Oct. 27, 2020.

First Office Action issued by the Chinese Patent Office for the Chinese Patent Application No. 201910741403.4 on Dec. 1, 2022.

Second Office Action issued by the Chinese Patent Office for the Chinese Patent Application No. 201910741403.4 on May 18, 2023.

First Office Action issued by the Japanese Patent Office for the Japanese Patent Application No. 2022-506289, dated Jan. 10, 2023.

Second Office Action issued by the Japanese Patent Office for Japanese Patent Application No. 2022-506289, dated May 23, 2023.

Examination Report for the Indian Patent Application No. 202247009256 issued by the Indian Patent Office on Jul. 25, 2022.

Extended European Search Report for the European Patent Application No. 20852192.2 issued by the European Patent Office on Aug. 5, 2022.

Office Action for the Korean Patent Application No. 10-2022-7006035 issued by the Korean Intellectual Property Office on Feb. 25, 2025.

* cited by examiner

RANGING METHOD AND DEVICE

CROSS-REFERENCE TO RELATED APPLICATIONS

This application is a Bypass Continuation Application of PCT/CN2020/103573 filed on Jul. 22, 2020, which claims priority to Chinese Patent Application No. 201910741403.4 filed on Aug. 12, 2019, which are incorporated herein by reference in their entirety.

TECHNICAL FIELD

Embodiments of the present disclosure relate to the field of communication technologies, and in particular, to a ranging method and a device.

BACKGROUND

In vehicle to everything (V2X) communications, communication technologies for directly transmitting data using sidelinks, mainly including vehicle to vehicle (V2V) communication, vehicle to infrastructure (V2I) communication, vehicle to network (V2N) communication, and vehicle to pedestrian (V2P) communication, may be used between a vehicle and objects around the vehicle.

Currently, a vehicle can communicate with objects around the vehicle. Therefore, to prevent the vehicle from colliding with the objects around the vehicle, the distances between the vehicle and the objects around the vehicle may be measured based on a sidelink communication technology, thereby preventing traffic accidents. Therefore, how to measure a distance between any two objects based on a sidelink technology becomes an urgent problem to be resolved.

SUMMARY

According to a first aspect, an embodiment of the present disclosure provides a ranging method. The method is applied to a first user equipment (UE). The method may include: sending a first signal, where a time at which the first signal is sent from the first UE is a first time; receiving a second signal sent by a second UE, where a time at which the second signal reaches the first UE is a second time; and determining a distance between the first UE and the second UE according to the first time, the second time, and a first time difference, where the first time difference is a difference between a third time at which the second UE sends the second signal and a fourth time at which the second UE receives the first signal, and the first time difference is sent by the second UE to the first UE.

According to a second aspect, an embodiment of the present disclosure provides a ranging method. The method is applied to a second UE. The method may include: receiving a first signal sent by a first UE, where a time at which the first signal reaches the second UE is a fourth time; and sending a second signal, where a time at which the second signal is sent from the second UE is a third time, and a difference between the third time and the fourth time is a first time difference, where the second signal is used for determining a distance between the first UE and the second UE by the first UE according to a first time, a second time, and the first time difference; and the first time is a time at which the first signal is sent from the first UE, the second time is a time at which the second signal reaches the first UE, and the first time difference is sent by the second UE to the first UE.

According to a third aspect, an embodiment of the present disclosure provides a UE. The UE is a first UE. The first UE may include a sending module, a receiving module, and a determining module. The sending module is configured to send a first signal, where a time at which the first signal is sent from the first UE is a first time; the receiving module is configured to receive a second signal sent by a second UE, where a time at which the second signal reaches the first UE is a second time; and the determining module is configured to determine a distance between the first UE and the second UE according to the first time, the second time, and a first time difference, where the first time difference is a difference between a third time at which the second UE sends the second signal and a fourth time at which the second UE receives the first signal, and the first time difference is sent by the second UE to the first UE.

According to a fourth aspect, an embodiment of the present disclosure provides a UE. The UE is a second UE. The second UE may include a receiving module and a sending module. The receiving module is configured to receive a first signal sent by a first UE, where a time at which the first signal reaches the second UE is a fourth time; and the sending module is configured to send a second signal, where a time at which the second signal is sent from the second UE is a third time, and a difference between the third time and the fourth time is a first time difference, where the second signal is used for determining a distance between the first UE and the second UE by the first UE according to a first time, a second time, and the first time difference; and the first time is a time at which the first signal is sent from the first UE, the second time is a time at which the second signal reaches the first UE, and the first time difference is sent by the second UE to the first UE.

According to a fifth aspect, an embodiment of the present disclosure provides a UE. The UE is a first UE. The UE includes a processor, a memory, and a computer program stored in the memory and executable on the processor, wherein when the computer program is executed by the processor, steps of the ranging method according to the first aspect are implemented.

According to a sixth aspect, an embodiment of the present disclosure provides a UE. The UE is a second UE. The UE includes a processor, a memory, and a computer program stored in the memory and executable on the processor, wherein when the computer program is executed by the processor, steps of the ranging method according to the second aspect are implemented.

According to a seventh aspect, an embodiment of the present disclosure provides a communication system. The communication system includes the UE in the third aspect and the UE in the fourth aspect. Alternatively, the communication system includes the UE in the fifth aspect and the UE in the sixth aspect.

According to an eighth aspect, an embodiment of the present disclosure provides a non-transitory computer-readable storage medium, storing a computer program, wherein when the computer program is executed by a processor, steps of the ranging method in the first aspect or the second aspect are implemented.

DETAILED DESCRIPTION

Figure 1:
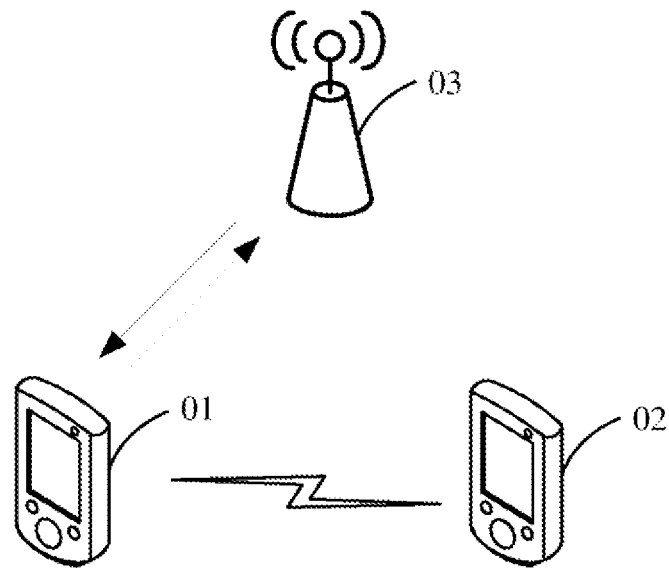
FIG. 1 is a schematic architectural diagram of a communication system according to an embodiment of the present disclosure.

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure shall fall within the protection scope of the present disclosure.

The term "and/or" used herein describes an association relationship for describing associated objects and represents that three relationships may exist. For example, A and/or B may represent the following three cases: Only A exists, both A and B exist, and only B exists. The character "/" used herein indicates an "or" relationship between associated objects. For example, A/B represents A or B.

In the specification and claims of the present disclosure, the terms "first", "second", and the like are intended to distinguish between different objects but do not indicate a particular order of the objects. For example, a first time, a second time, and the like are intended to distinguish between different times but do not indicate a particular order of times.

In the embodiments of the present disclosure, the word "exemplary" or "for example" is used to represent giving an example, an illustration, or a description. Any embodiment or design scheme described as an "exemplarily" or "for example" in the embodiments of the present disclosure should not be explained as having more advantages than another embodiment or design scheme. Exactly, use of the word "exemplarily" or "for example" or the like is intended to present a related concept in a specific manner.

In the description of the embodiments of the present disclosure, unless otherwise stated, "a plurality of" means two or more. For example, a plurality of UEs mean two or more UEs.

Some terms involved in the embodiments of the present disclosure are explained and described below. Sidelink technology: it refers to a technology in which data may be directly transmitted between UEs without a network side device. Currently, sidelink transmission mainly includes such several transmission forms as broadcast, multicast, and unicast. A control node and a UE may communicate with each other through a Uu interface and by using uplink and downlink, and UEs may communicate with each other through a PC5 interface and by using sidelink.

Moreover, sidelink has two resource allocation modes: a scheduled resource allocation mode and an autonomous resource selection mode. The former may be referred to as mode1, in which a control node performs control and allocates a resource to each UE; and the latter may be referred to as mode2, in which a UE autonomously selects a resource. For some UEs, the two resource allocation modes may be performed simultaneously.

Vehicle to everything (V2X) technology: it refers to a technology in which a vehicle may communicate with another vehicle and another related device around the vehicle, and mainly includes various service such as basic security communication, advanced driving, vehicle formation, and sensor extension. V2X mainly includes V2V, V2I, V2N, and V2P.

The embodiments of the present disclosure provide a ranging method, a device, and a system. A first UE may send a first signal, where a time at which the first signal is sent from the first UE is a first time; receive a second signal sent by a second UE, where a time at which the second signal reaches the first UE is a second time; and determining a distance between the first UE and the second UE according to the first time, the second time, and a first time difference, where the first time difference is a difference between a third time at which the second UE sends the second signal and a fourth time at which the second UE receives the first signal, and the first time difference is sent by the second UE to the first UE. Through the solutions, by sending the first signal to the second UE and receiving the second signal sent by the second UE, the first UE may obtain the time at which the first signal is sent from the first UE, the time difference between the time at which the second signal is sent from the second UE and the time at which the first signal reaches the second UE, and the time at which the second signal reaches the first UE. In this way, the first UE may obtain a round-trip time of signal transmission between the first UE and the second UE, to measure the distance between the first UE and the second UE, for example, may measure a distance between a vehicle and another vehicle, between a vehicle and a pedestrian, or between a vehicle and another object, thereby preventing a transportation accident from occurring.

The ranging method, the device, and the system provided in the embodiments of the present disclosure are applied to a sidelink communication system, and are specifically applied to a scenario in which a distance between a vehicle and another object around the vehicle is measured through a sidelink communication system, for example, a scenario in which a distance between a vehicle and another vehicle around the vehicle is measured through a sidelink communication system.

FIG. 1 is a schematic architectural diagram of a communication system according to an embodiment of the present disclosure. As shown in FIG. 1, the communication system may include a first UE 01, a second UE 02, and a control node 03.

An uplink and downlink connection may be established between the first UE 01 and the control node 03, and a sidelink connection may be established between the first UE 01 and the second UE 02.

A UE is a device that provides voice and/or data connectivity for a user, a handheld device with a wired/wireless connection function, or another processing device connected to a wireless modem. The UE may communicate with one or more core network devices through a radio access network (RAN). The UE may be a mobile terminal such as a mobile phone (or referred to as a "cellular" phone), a computer with a mobile terminal, or a portable, pocket-sized, handheld, computer built-in, or in-vehicle mobile apparatus, which exchanges voice and/or data with the RAN and is a device such as a personal communication service (PCS) phone, a cordless telephone set, a Session Initiation Protocol (SIP) phone, a wireless local loop (WLL) station, or a personal digital assistant (PDA). The UE may be also referred to as a user agent, a terminal device, or the like.

The control node is a device used for providing a wireless communication function. In this embodiment of the present disclosure, the control node may be a base station, a UE, an integrated access and backhaul (IAB) node, a relay station, a road side unit (RSU), or another network facility. The base station may include various forms of macro base stations and micro base stations. In systems using different radio access technologies, names of devices having base station functions may be different. For example, in a 5G system, the base station may be referred to as a 5G next-generation Node B (gNB); in a fourth-generation wireless communication (4G) system such as an LTE system, the base station may be referred to as an evolved Node B (eNB); and in a third-generation mobile communication (3G) system, the base station may be referred to as a Node B. It should be noted that, with the evolution of communication technologies, such a name as "base station" may change.

The ranging method, the device, and the system provided in the embodiments of the present disclosure are described below with reference to the accompanying drawings and through specific embodiments and application scenarios thereof.

Figure 2:
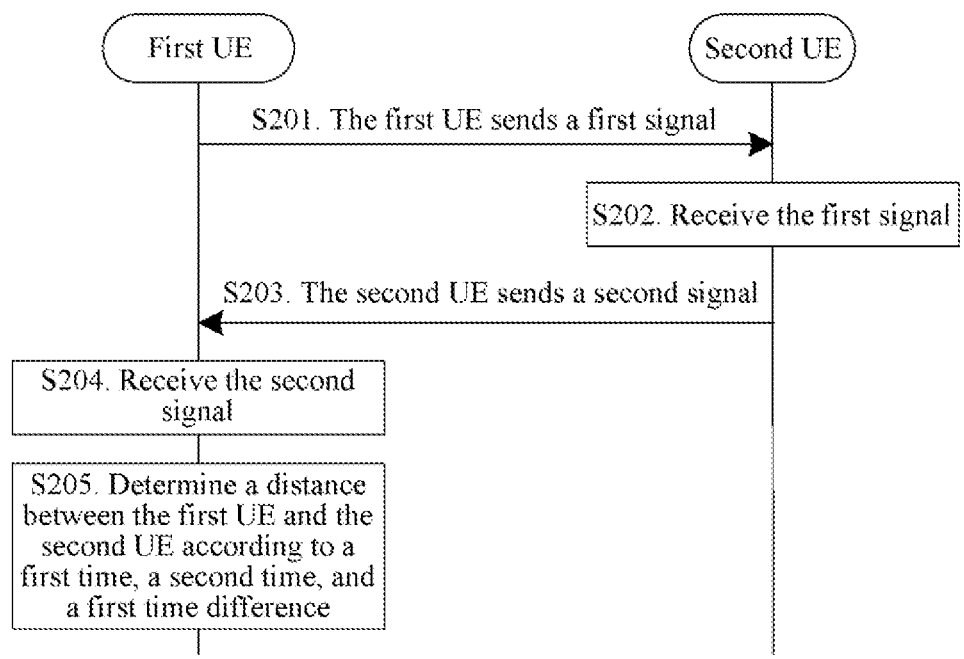
FIG. 2 is a first schematic diagram of a ranging method according to an embodiment of the present disclosure.

Based on the communication system shown in FIG. 1, an embodiment of the present disclosure provides a ranging method. The method is applied to a first UE and a second UE. As shown in FIG. 2, the method may include the following S201 to S205:

S201. The first UE sends a first signal.

A time at which the first signal is sent from the first UE is a first time.

In this embodiment of the present disclosure, the first UE may be a ranging request UE, and the second UE may be a ranging assistance UE.

Optionally, sidelink communication or another possible communication may be performed between the first UE and the second UE.

Optionally, the first signal may be a broadcast signal, a multicast signal, or a unicast signal. That is, the first UE may broadcast the first signal, multicast the first signal, or unicast the first signal.

Optionally, the first signal may carry a ranging message, which may be divided into the following three cases:

Case 1. The first signal may carry a ranging message. The ranging message may be used for obtaining a fourth time by the second UE, and requesting the second UE to send a second signal or send a second signal and a first time difference after receiving the first signal.

For the case 1, the ranging message not only may be used for obtaining the fourth time by the second UE, but also may be used for requesting the second UE to send the second signal or send the second signal and the first time difference after receiving the first signal. Therefore, it may be assumed that a measurement request message is implicitly included in the ranging message. That is, a resource for transmitting the ranging message is a dedicated resource, and provided that another UE detects the ranging message, it may be assumed that the measurement request message is received. For example, the ranging message is a dedicated sequence, and provided that another UE detects the ranging message, it is assumed that the measurement request message is received.

Case 2. The first signal may carry a ranging message and a ranging request message. The ranging message may be used for obtaining a fourth time by the second UE, and the ranging request message may be used for requesting the second UE to send a second signal or send a second signal and a first time difference after receiving the first signal.

Case 3. The first signal may carry a ranging message. The ranging message may be used for obtaining a fourth time by the second UE.

For the case 3, the ranging method provided in this embodiment of the present disclosure may further include: sending, by the first UE, a third signal carrying a ranging request message. The ranging request message may be used for requesting the second UE to send a second signal or send a second signal and a first time difference after receiving the first signal.

Optionally, the third signal may further carry a first identifier used for indicating the first UE.

Optionally, the third signal may be a broadcast signal, a multicast signal, or a unicast signal. That is, the first UE may broadcast the third signal, multicast the third signal, or unicast the third signal.

It should be noted that, in a case that the first signal carries a ranging message, the first time may be specifically the time at which the ranging message is sent from the first UE.

Moreover, an order of the times at which the first UE sends the first signal and sends the third signal is not limited in this embodiment of the present disclosure, and may be determined according to actual use requirements.

Figure 3:
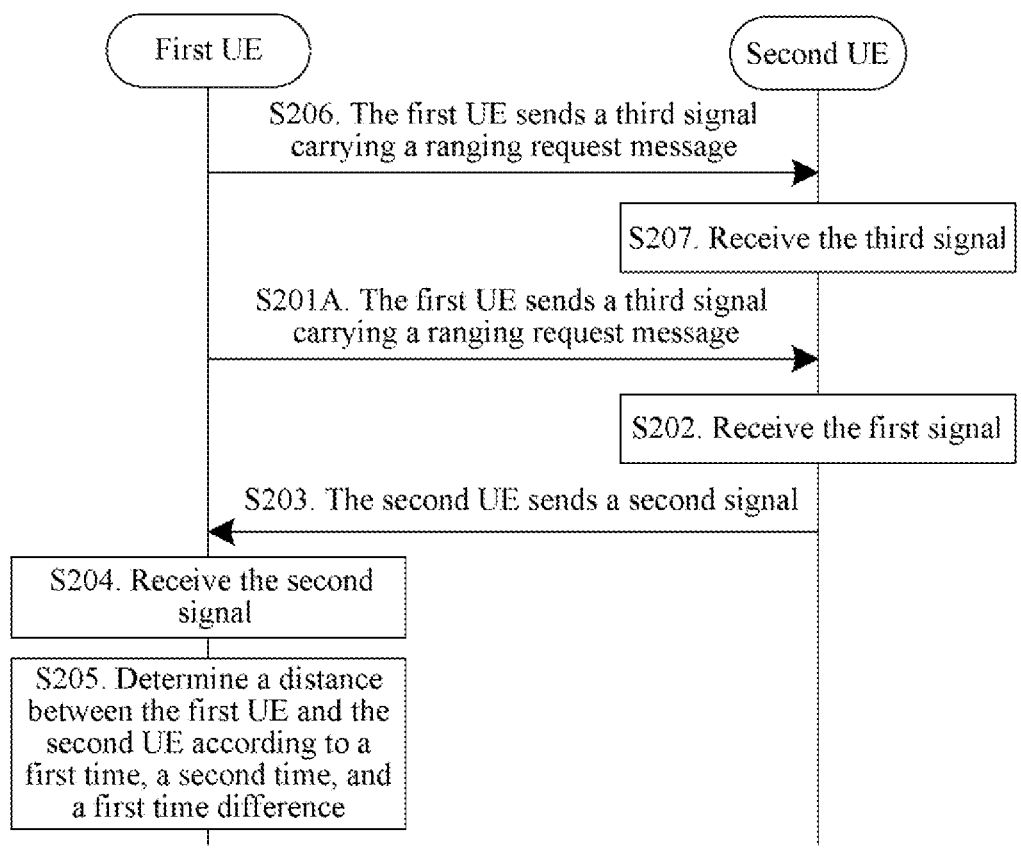
FIG. 3 is a second schematic diagram of a ranging method according to an embodiment of the present disclosure.

Exemplarily, with reference to FIG. 2, as shown in FIG. 3, the first UE may first send a third signal carrying a ranging request message, and then send a first signal carrying a ranging message, that is, the first UE may first perform S206, and then perform S201A. Correspondingly, the second UE may first receive the third signal, and then receive the first signal, that is, the second UE may first perform S207, and then perform S202.

Figure 4:
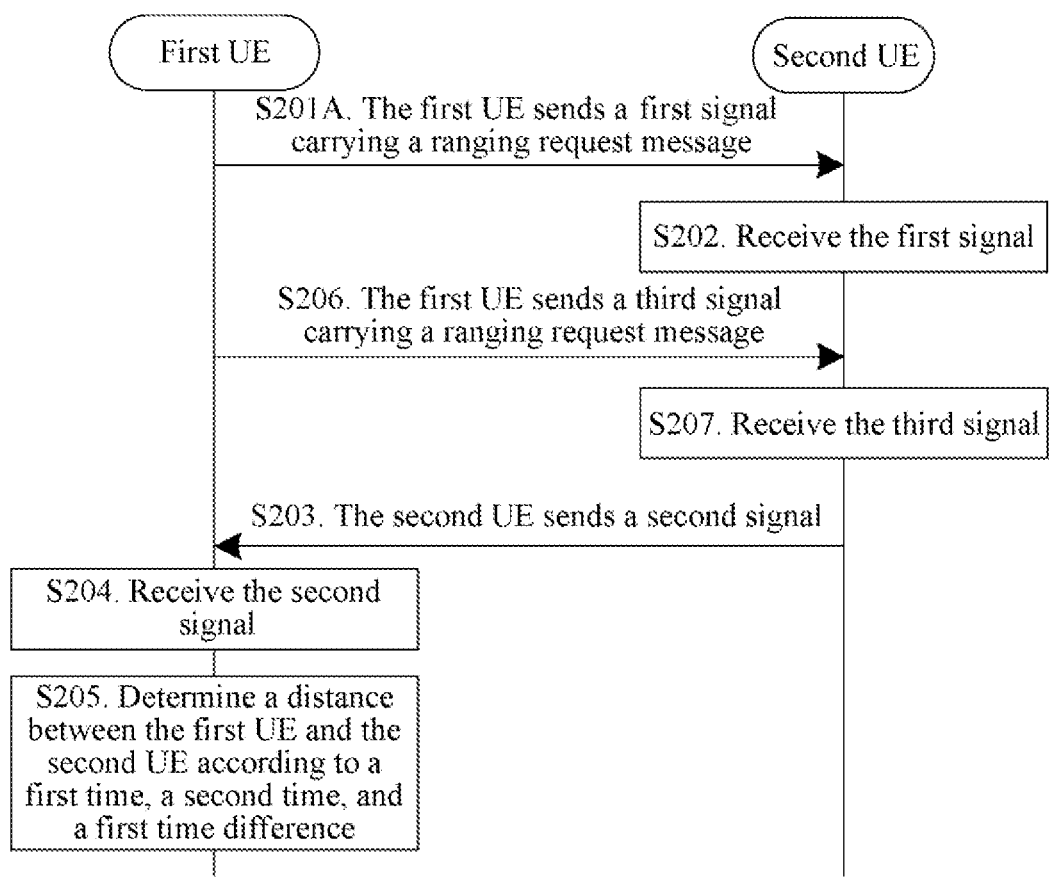
FIG. 4 is a third schematic diagram of a ranging method according to an embodiment of the present disclosure.

Exemplarily, with reference to FIG. 2, as shown in FIG. 4, the first UE may first send a first signal carrying a ranging message, and then send a third signal carrying a ranging request message, that is, the first UE may first perform S201A, and then perform S206. Correspondingly, the second UE may first receive the first signal, and then receive the third signal, that is, the second UE may first perform S202, and then perform S207.

Optionally, the ranging message may be a physical measurement signal used for ranging or a higher layer signal data block. The physical measurement signal may be a reference signal (RS) used for ranging, an RS in sidelink, a synchronization signal, a preamble sequence, or the like, and the higher layer signal data block may be Radio Resource Control (RRC) signaling, Media Access Control control element (MAC CE) signaling, or the like. Optionally, the UE 1 or the control node may further indicate whether the ranging message sent to the UE 2 includes a reference signal. The indication may be carried in RRC signaling, MAC CE signaling, downlink control information (DCI) signaling, or sidelink control information (SCI) signaling, or may be preconfigured by the control node.

Optionally, the first signal may carry a first identifier indicating the first UE.

Optionally, the first identifier may include at least one of: an identifier of the first UE or a first resource identifier.

Optionally, the first identifier may be used as a scrambling identifier (ID) or a sequence ID, or be carried by a data block.

Exemplarily, the first identifier may be carried in a sequence of a ranging message S1, that is, the sequence of the ranging message S1 may be scrambled by the first identifier or the first identifier may be used as a queue identifier of the ranging message S1.

Optionally, the first identifier may be configured by a control node for the first UE, configured by the second UE for the first UE through signaling, preconfigured by a protocol or vendor, selected by the first UE from an information set, generated by the first UE according to higher layer information, or generated by the first UE according to an indication from the control node or a rule in a protocol. The information set may be broadcast or multicast by the control node, preconfigured by the control node, and/or predefined by a protocol.

It should be noted that, in this embodiment of the present disclosure, the first signal may carry a ranging message; or the first signal may carry a ranging message and a first identifier of the first UE.

S202. The second UE receives the first signal.

The time at which the first signal reaches the second UE may be the fourth time, that is, the time at which the second UE receives the first signal may be the fourth time.

It should be noted that, in a case that the first signal carries a ranging message, the fourth time may be specifically the time at which the ranging message reaches the second UE.

In this embodiment of the present disclosure, the second UE may obtain the time at which the first signal reaches the second UE, that is, the fourth time according to a measurement or demodulation result. Moreover, in any one of the following situations, the second UE may continue to perform the following S203.

Situation 1. The second UE obtains the ranging request message from the first signal sent by the first UE.

Situation 2. If a resource used for transmitting the ranging message is a dedicated resource, after the second UE receives the ranging message sent by the first UE, the second UE may verify that a time domain resource used for transmitting the ranging message is a dedicated time domain resource, and it is assumed that the ranging request message is received.

Situation 3. Before receiving the first signal sent by the first UE, the second UE obtains the ranging request message from the third signal sent by the first UE.

Situation 4. After receiving the first signal sent by the first UE, the second UE obtains the ranging request message from the third signal sent by the first UE.

Optionally, if the first identifier used for indicating the first UE is carried in a sequence of the ranging message S1 sent by the first UE, the second UE may obtain the first identifier by processing the sequence of the ranging message S1. S203. The second UE sends a second signal.

A time at which the second signal is sent from the second UE is a third time. A difference between the third time and the fourth time is a first time difference.

Optionally, the second signal may be a broadcast signal, a multicast signal, or a unicast signal. That is, the second UE may broadcast the first signal, multicast the first signal, or unicast the first signal.

Optionally, the second signal may be in the following manner 1 or manner 2:

Manner 1. The second signal carries a ranging response message and the first time difference. The ranging response message may be used for obtaining, by the first UE, the time at which the second signal reaches the first UE, that is, the second time.

Optionally, the second signal may directly carry the first time difference; or the second signal may carry the third time and the fourth time, so that the first UE may obtain the first time difference according to the third time and the fourth time.

Optionally, the first time difference may be included in a data block or a payload of the ranging response message.

Manner 2. The second signal carries a ranging response message. The ranging response message may be used for obtaining, by the first UE, the time at which the second signal reaches the first UE, that is, the second time.

Optionally, for the manner 2, before the second UE sends the second signal or after the second UE sends the second signal, the ranging method provided in this embodiment of the present disclosure may further include: sending, by the second UE, a fourth signal carrying the first time difference. Correspondingly, after the receiving the second signal sent by the second UE or before the receiving the second signal sent by the second UE, the ranging method provided in this embodiment of the present disclosure may further include: receiving, by the first UE, a fourth signal carrying the first time difference from the second UE.

Optionally, the fourth signal may further carry a first identifier indicating the first UE and a second identifier indicating the second UE.

Optionally, the fourth signal may directly carry the first time difference; or the fourth signal may carry the third time and the fourth time, so that the first UE may obtain the first time difference according to the third time and the fourth time.

Optionally, the fourth signal may be a broadcast signal, a multicast signal, or a unicast signal. That is, the second UE may broadcast the fourth signal, multicast the fourth signal, or unicast the fourth signal.

It should be noted that, in a case that the second signal carries a ranging response message, the third time may be specifically the time at which the ranging response message is sent from the second UE.

For the manner 2, an order of the times at which the second UE sends the second signal and sends the fourth signal is not limited in this embodiment of the present disclosure, and may be determined according to actual use requirements.

Figure 5:
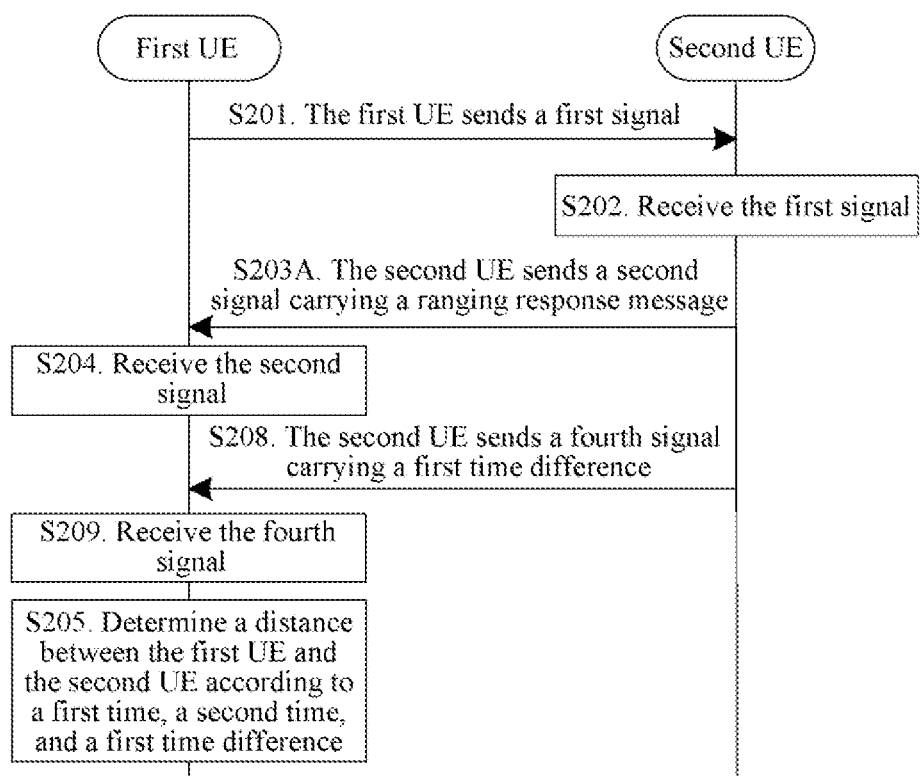
FIG. 5 is a fourth schematic diagram of a ranging method according to an embodiment of the present disclosure.

Exemplarily, with reference to FIG. 2, as shown in FIG. 5, the second UE may first send a second signal carrying a ranging response message, and then send a fourth signal carrying a first time difference, that is, the second UE may first perform S203A, and then perform S208. Correspondingly, the first UE may first receive the second signal, and then receive the fourth signal, that is, the first UE may first perform S204, and then perform S209.

Figure 6:
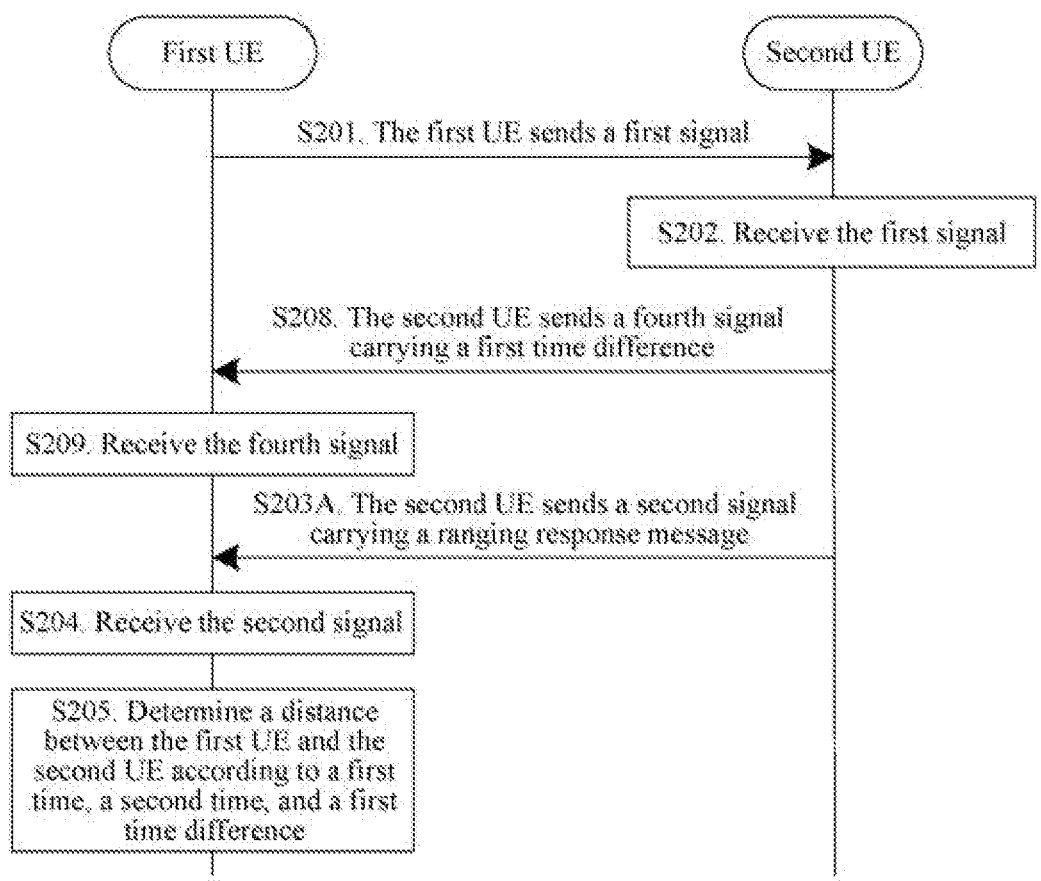
FIG. 6 is a fifth schematic diagram of a ranging method according to an embodiment of the present disclosure.

Exemplarily, with reference to FIG. 2, as shown in FIG. 6, the second UE may first send a fourth signal carrying a first time difference, and then send a second signal carrying a ranging response message, that is, the second UE may first perform S208, and then perform S203A. Correspondingly, the first UE may first receive the fourth signal, and then receive the second signal, that is, the first UE may first perform S209, and then perform S204.

Optionally, the ranging response message may be a physical measurement signal or a higher layer signal data block used for indicating ranging. The physical measurement signal may be an RS used for ranging, an RS in sidelink, a synchronization signal, a preamble sequence, or the like, and the higher layer signal data block may be RRC signaling, MAC CE signaling, or the like.

The UE 2 or the control node may further indicate whether the ranging response message sent to the UE 1 includes a reference signal. The indication may be carried in RRC signaling, MAC CE signaling, downlink control information (DCI) signaling, or sidelink control information (SCI) signaling, or may be preconfigured by the control node.

Optionally, the second signal may carry a second identifier indicating the second UE or carry a first identifier indicating the first UE and a second identifier indicating the second UE.

Optionally, the second identifier may include at least one of: an identifier of the second UE or a second resource identifier.

Optionally, the second identifier may be used as a scrambling ID or a sequence ID, or be carried by a data block.

Exemplarily, the second identifier may be carried in a sequence of a ranging response message S2, that is, the sequence of the ranging response message S2 may be scrambled by the second identifier or the second identifier may be used as a queue identifier of the ranging response message S2.

Optionally, the second identifier may be configured by the control node for the second UE, configured by the first UE for the second UE through signaling, preconfigured by a protocol or vendor, selected by the second UE from the information set, generated by the second UE according to higher layer information, or generated by the second UE according to an indication from the control node or a rule in a protocol. The information set may be broadcast or multicast by the control node, preconfigured by the control node, and/or predefined by a protocol.

It should be noted that, in this embodiment of the present disclosure, the second signal may carry a ranging response message; or the second signal may carry a ranging response message and a second identifier of the second UE; or the second signal may carry a ranging response message, a first identifier of the first UE, or a first identifier of the second UE.

S204. The first UE receives the second signal.

The time at which the second signal reaches the first UE is the second time, that is, the time at which the first UE receives the second signal may be the second time.

It should be noted that, in a case that the second signal carries a ranging response message, the second time may be specifically the time at which the ranging message reaches the first UE. In this embodiment of the present disclosure, the first UE may obtain the time at which the second signal reaches the first UE, that is, the second time according to a measurement or demodulation result. Moreover, in any one of the following scenarios, the first UE may continue to perform the following S205.

Scenario 1. The first UE obtains a first time difference from the second signal sent by the second UE.

Scenario 2. Before receiving the second signal sent by the second UE, the first UE receives a fourth signal carrying a first time difference from the second UE, that is, obtains the first time difference from the fourth signal sent by the second UE.

Scenario 3. After receiving the second signal sent by the second UE, the first UE receives a fourth signal carrying a first time difference from the second UE, that is, obtains the first time difference from the fourth signal sent by the second UE.

S205. The first UE determines a distance between the first UE and the second UE according to the first time, the second time, and the first time difference.

Optionally, the foregoing S205 may include: determining, by the first UE according to the first time difference and a second time difference, the distance between the first UE and the second UE. The second time difference is a difference between the second time and the first time.

Exemplarily, assuming that the first time is represented by using $t_0$, the second time is represented by using $t_3$, the third time is represented by using $t_2$, the fourth time is represented by using $t_1$, and the speed of light is represented by using c, the distance between the first UE and the second UE may be: $[(t_3-t_0)-(t_2-t_1)] \div 2 \times c$. It may be understood that, because reference only needs to be made to a synchronization source of the first UE for $t_3$ and $t_0$, and reference only needs to be made to a synchronization source of the second UE for $t_2$ and $t_1$, the first UE and the second UE do not need to be absolutely synchronous during use of this manner.

Optionally, a unit/granularity of the first time difference, and a unit/granularity of the second time difference may be a time domain sampling granularity of the ranging message in the first signal, a time domain sampling granularity of the ranging response message in the second signal, a time domain sampling granularity of an orthogonal frequency-division multiplexing (OFDM) symbol at a current moment, or another granularity configured by a network or appointed by a protocol.

It should be noted that, in the foregoing S201 to S205 in this embodiment of the present disclosure, an exemplary description is made by using the first UE and the second UE as an example, which does not constitute any limitation. It may be understood that, there may be a plurality of UEs participating in ranging/positioning, and the first UE and the second UE may be any two of the plurality of UEs, and may be specifically determined according to actual use requirements.

Moreover, in this embodiment of the present disclosure, an exemplary description is made by using an example in which the first UE sends the first message, the second UE receives the first message, the second UE sends the second message, and the first UE receives the second message, which does not constitute any limitation. It may be understood that, during actual implementation, alternatively, the second UE sends the first message, the first UE receives the first message, the first UE sends the second message, and the second UE receives the second message, which may be determined according to actual use requirements.

According to the ranging method provided in this embodiment of the present disclosure, by sending the first signal to the second UE and receiving the second signal sent by the second UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

Figure 7:
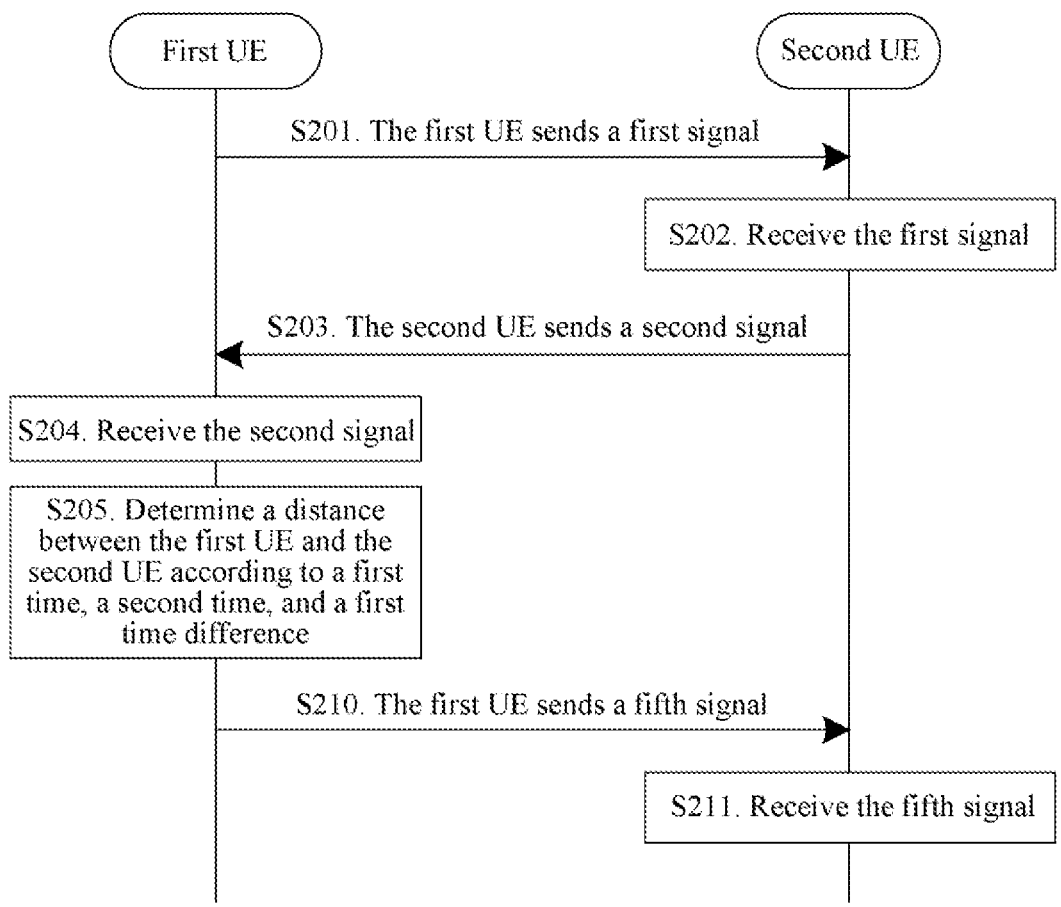
FIG. 7 is a sixth schematic diagram of a ranging method according to an embodiment of the present disclosure.

Optionally, with reference to FIG. 2, as shown in FIG. 7, in a case that there is at least one second UE, after the foregoing S205, the ranging method provided in this embodiment of the present disclosure may further include the following S210 and S211.

S210. The first UE sends a fifth signal.

S211. The second UE receives the fifth signal.

The fifth signal may carry at least one set of information. Each set of information may include at least one of target distance information or identifier information. The identifier information may include a first identifier and a second identifier. The target distance information in each set of information may be used for indicating the distance between the first UE and the second UE.

Optionally, the fifth signal may be a broadcast signal, a multicast signal, or a unicast signal. That is, the first UE may broadcast the fifth signal, multicast the fifth signal, or unicast the fifth signal.

Exemplarily, an exemplary description is made by using an example in which the fifth signal is a broadcast signal and there are M (M is a positive integer) second UEs. The first UE may obtain M sets of information, and broadcast the M sets of information. Each set of information may include the target distance information, the first identifier, and one second identifier. Therefore, the second UE receiving the broadcast information may determine, according to the first identifier and the second identifier, whether the target distance information corresponding to the first identifier and the second identifier is target distance information corresponding to the second UE. If the target distance information is the target distance information corresponding to the second UE, the second UE may determine a distance between the second UE and the first UE.

According to the ranging method provided in this embodiment of the present disclosure, the first UE broadcasts/multicasts/unicasts the fifth signal carrying at least one set of information, to enable the second UE receiving the fifth signal to determine the distance between the second UE and the first UE.

Optionally, the foregoing S201 may be implemented through S201a, the foregoing S202 may be implemented through S202a, the foregoing S203 may be implemented through S203a, and the foregoing S204 may be implemented through S204a.

S201a. The first UE sends a first signal according to first information.

The first information may be configuration information corresponding to the first UE.

Optionally, the first UE may generate the first signal according to the first information and a preset rule and send the first signal. The preset rule may be a rule predefined by a protocol or indicated by the control node.

Optionally, the first information may include at least one of: first sequence information, first time frequency resource information, or a first resource identifier.

Exemplarily, an exemplary description is made by using an example in which the first information is the first sequence information. The first UE may generate, according to the first sequence information and a mapping manner predefined by a protocol, the first signal used for ranging.

Exemplarily, an exemplary description is made by using an example in which the first information is the first resource identifier. The first UE may generate an RS sequence according to the first resource identifier and a sequence generating manner predefined by a protocol; and perform mapping on the RS sequence according to a mapping manner predefined by a protocol, and therefore may generate the first signal used for ranging.

Exemplarily, an exemplary description is made by using an example in which the first information is the first resource identifier and the first time frequency resource information. The first UE may generate an RS sequence according to the first resource identifier and a sequence generating manner predefined by a protocol; and generate, according to the RS sequence and the first time frequency resource information, the first signal used for ranging.

Exemplarily, an exemplary description is made by using an example in which the first information is the first sequence information and the first time frequency resource information. The first UE may generate a sequence according to the first sequence information; and generate, according to the sequence and the first time frequency resource information, the first signal used for ranging.

Optionally, the first information may be configured by a control node for the first UE through signaling, selected by the first UE from an information set, or configured by the second UE for the first UE through signaling. The information set may be broadcast or multicast by the control node, preconfigured by the control node, and/or predefined by a protocol.

Exemplarily, in a case that a sidelink connection is established between the first UE and the second UE, the control node may configure the first information for the first UE through signaling.

Exemplarily, in a case that a sidelink connection is not established between the first UE and the second UE and a connection is established between the first UE and the control node, the control node may configure the first information for the first UE through signaling. Exemplarily, the control node may configure an information set for the first UE through signaling, where the information set may include configuration information of a plurality of UEs, and the configuration information of the plurality of UEs includes the first information; or the control node may configure the first information for the first UE through signaling.

Exemplarily, in a case that a sidelink connection is not established between the first UE and the second UE, a connection is not established between the first UE and the control node, and the first UE is covered by the control node, the first UE may select the first information from an information set. The information set may be broadcast or multicast by the control node, preconfigured by the control node, and/or predefined by a protocol.

Exemplarily, in a case that a sidelink connection is not established between the first UE and the second UE, a connection is not established between the first UE and the control node, and the first UE is not covered by the control node, the first information may be information selected by the first UE from an information set. The information set may be preconfigured by the control node, and/or predefined by a protocol.

Optionally, a positioning resource corresponding to the first information may be a Uu resource on a licensed band, a sidelink resource on a licensed band (for example, a resource in a sidelink resource pool), a resource on an ITS band (for example, a resource in a sidelink resource pool), or a resource on a non-licensed band.

It should be noted that, the foregoing information set may be also referred to as an information group, an information pool, an information cluster, a plurality of pieces of information, or the like. A positioning resource set corresponding to the information set may be also referred to as a resource group, a resource pool, a resource cluster, a plurality of resources, or the like. A resource set may be further represented as a resource configuration, a resource configuration set, a plurality of resources configurations, a resource configuration group, or the like.

Optionally, the information set may include at least one of: a plurality of resources orthogonal to each other in time domain, a plurality of resources orthogonal to each other in frequency domain, a plurality of resources orthogonal to each other in code domain, or a plurality of resources orthogonal to each other in spatial domain.

Optionally, a target time frequency resource may be a time frequency resource shared by a target signal and another signal or a channel; or a target time frequency resource may be a time frequency resource dedicated to the target signal. The target time frequency resource may be a time frequency resource for transmitting the target signal, and the target signal may be the first signal, the second signal, or another possible ranging signal.

Exemplarily, the first signal may share a time frequency resource grid with a data channel, a control channel, or another RS. The control channel may be a physical sidelink shared channel (PSSCH) or a physical sidelink control channel (PSCCH).

It should be noted that, when a target time frequency resource is a time frequency resource dedicated to the target signal, the target time frequency resource is only used for sending a signal used for ranging, but cannot send a data channel, a control channel, or another RS.

Optionally, before the first UE sends the first signal, the ranging method provided in this embodiment of the present disclosure may further include: sending first information, where the first information is used for receiving the first signal by another UE. The first information may include at least one of: first sequence information, first time frequency resource information, or a first resource identifier. The UE 1 may send the first information in a broadcast, multicast, or unicast manner.

S202a. The second UE receives the first signal according to the first information.

Optionally, the first information is configuration information corresponding to the first UE or configuration information corresponding to a plurality of UEs, and the plurality of UEs may include the first UE.

Optionally, the second UE may receive the first signal according to the first information and a preset rule. The preset rule is a rule predefined by a protocol or indicated by the control node.

Optionally, before the second UE receives the first signal according to the first information, the ranging method provided in this embodiment of the present disclosure may further include: obtaining the first information.

Optionally, the second UE may measure or demodulate the first signal in any one of the following manners:

1) The first signal is measured according to the first information sent by the first UE.

2) Blind detection is performed on the first signal according to a plurality of pieces of information configured by the control node, where the plurality of pieces of information include the first information.

3) Blind detection is performed on the first signal according to a plurality of pieces of information broadcast by the control node, where the plurality of pieces of information include the first information.

4) Blind detection is performed on the first signal according to a plurality of pieces of information predefined by a protocol, where the plurality of pieces of information include the first information.

5) Blind detection is performed on the first signal according to a plurality of pieces of information preconfigured by a vendor, where the plurality of pieces of information include the first information.

6) Blind detection is performed on the first signal in another manner.

Optionally, if the first UE sends the first information before the first UE sends the first signal carrying the ranging message, the second UE may first obtain the first information, and then obtain the first signal.

S203a. The second UE sends a second signal according to second information.

The second information may be configuration information corresponding to the second UE.

Optionally, the second UE may generate the second signal according to the second information and a preset rule and send the second signal. The preset rule is a rule predefined by a protocol or indicated by the control node.

Optionally, the second information may include at least one of: second sequence information, second time frequency resource information, or a second resource identifier.

Exemplarily, an exemplary description is made by using an example in which the second information is the second sequence information. The second UE may generate, according to the second sequence information and a mapping manner predefined by a protocol, the second signal used for ranging.

Exemplarily, an exemplary description is made by using an example in which the second information is the second resource identifier. The second UE may generate an RS sequence according to the second resource identifier and a sequence generating manner predefined by a protocol; and perform mapping on the RS sequence according to a mapping manner predefined by a protocol, and therefore may generate the second signal used for ranging.

Exemplarily, an exemplary description is made by using an example in which the second information is the second resource identifier and the second time frequency resource information. The second UE may generate an RS sequence according to the second resource identifier and a sequence generating manner predefined by a protocol; and generate, according to the RS sequence and the second time frequency resource information, the second signal used for ranging.

Exemplarily, an exemplary description is made by using an example in which the second information is the second sequence information and the second time frequency resource information. The second UE may generate a sequence according to the second sequence information; and generate, according to the sequence and the second time frequency resource information, the second signal used for ranging.

Optionally, the second information may be configured by the control node for the second UE through signaling, selected by the second UE from the information set, or configured by the first UE for the second UE through signaling. The information set is broadcast or multicast by the control node, preconfigured by the control node, and/or predefined by a protocol.

Exemplarily, in a case that a sidelink connection is established between the first UE and the second UE, the control node may configure the second information for the second UE through signaling.

Exemplarily, in a case that a sidelink connection is not established between the first UE and the second UE and a connection is established between the second UE and the control node, the control node may configure the second information for the second UE through signaling. Exemplarily, the control node may configure an information set for the second UE through signaling, where the information set includes configuration information of a plurality of UEs, and the configuration information of the plurality of UEs includes the second information; or the control node may configure the second information for the second UE through signaling.

Exemplarily, in a case that a sidelink connection is not established between the first UE and the second UE, a connection is not established between the second UE and the control node, and the second UE is covered by the control node, the second UE may select the second information from an information set. The information set may be broadcast or multicast by the control node, preconfigured by the control node, and/or predefined by a protocol.

Exemplarily, in a case that a sidelink connection is not established between the first UE and the second UE, a connection is not established between the second UE and the control node, and the second UE is not covered by the control node, the second UE may select the second information from an information set. The information set may be preconfigured by the control node, and/or predefined by a protocol.

Optionally, a positioning resource corresponding to the second information may be a Uu resource on a licensed band, a sidelink resource on a licensed band (for example, a resource in a sidelink resource pool), a resource on an ITS band (for example, a resource in a sidelink resource pool), or a resource on a non-licensed band.

It should be noted that, the foregoing information set may be also referred to as an information group, an information pool, an information cluster, a plurality of pieces of information, or the like. A positioning resource set corresponding to the information set may be also referred to as a resource group, a resource pool, a resource cluster, a plurality of resources, or the like. A resource set may be further represented as a resource configuration, a resource configuration set, a plurality of resources configurations, a resource configuration group, or the like.

Moreover, if a connection is not established between a plurality of UEs participating in positioning and the control node, the plurality of UEs may randomly select positioning resources from a resource pool preconfigured or a resource pool broadcast by the control node. Because the positioning resources are randomly selected, the positioning resources selected by the plurality of UEs may be the same. To avoid a case that a receiving UE cannot differentiate between the same positioning resources selected by the plurality of UEs, a sending UE may map, when sending a sidelink positioning signal, a unique ID of the UE into a data block carried in the positioning signal. The unique ID of the UE may be a globally unique ID, a unique ID within a specific range, an ID predefined by a vendor, or an ID preconfigured by the control node.

Optionally, before the second UE sends the second signal, the ranging method provided in this embodiment of the present disclosure may further include: sending, by the second UE, second information, where the second information may be used for receiving the second signal by another UE. The second information may include at least one of: second sequence information, second time frequency resource information, or a second resource identifier. The UE 1 may send the second information in a broadcast, multicast, or unicast manner.

S204a. The first UE receives the second signal according to the second information.

Optionally, the second information is configuration information corresponding to the second UE or configuration information corresponding to a plurality of UEs, and the plurality of UEs may include the second UE.

Optionally, the first UE may receive the second signal according to the second information and a preset rule. The preset rule is a rule predefined by a protocol or indicated by the control node.

Optionally, before the first UE receives, according to the second information, the second signal sent by the second UE, the ranging method provided in this embodiment of the present disclosure may further include: obtaining, by the first UE, the second information.

Optionally, the first UE may obtain the second information in any one of the following specific manners: receiving the second information sent by the control node; receiving the second information sent by the second UE; or selecting the second information from an information set. The information set may be broadcast or multicast by the control node, preconfigured by the control node, and/or predefined by a protocol.

Exemplarily, the control node may broadcast the second information, or multicast the second information, or unicast the second information to the first UE, and therefore the first UE may obtain the second information.

Exemplarily, the second UE may broadcast the second information, or multicast the second information, or unicast the second information to the second UE, and therefore the first UE may obtain the second information.

Exemplarily, the first UE may select, according to a predefined manner, the second information from an information set broadcast or multicast by the control node, an information set preconfigured by the control node, or an information set predefined by a protocol.

Optionally, in a case that the second information is information selected by the second UE from an information set, before S204a, the ranging method provided in this embodiment of the present disclosure may further include: receiving, by the first UE, the second information sent by the second UE.

Optionally, in a case that the second information is configured by the control node for the second UE through signaling, before S204a, the ranging method provided in this embodiment of the present disclosure may further include: receiving, by the first UE, signaling sent by the control node or the second UE. The signaling may be used for indicating the second information.

According to the ranging method provided in this embodiment of the present disclosure, by configuring the first information and the second information, the UE is enabled to generate a signal used for ranging or receive a signal used for ranging. In this way, four receiving/sending times may be obtained by sending the first signal, receiving the first signal, sending the second signal, and receiving the second signal between the UEs, and therefore a distance between the UEs may be determined according to the four receiving/sending times, that is, positioning between the UEs is implemented.

Optionally, an embodiment of the present disclosure further provides an information configuration method. The method is applied to a control node. If a connection is established between the control node and a plurality of UEs participating in positioning, the method includes the following S301 and S302; and if a connection is not established between the control node and the plurality of UEs participating in positioning, the method includes the following S303.

S301. In a case that a connection is established between the control node and a plurality of UEs participating in positioning, the control node configures a plurality of pieces of information for the plurality of UEs participating in positioning.

One piece of information is configured for one UE, and each information is used for broadcasting a ranging signal by the UE.

Optionally, the control node configures a unique identifier for each information.

Optionally, each information includes at least one of: sequence information, time frequency resource information, or a resource identifier.

S302. The control node sends the plurality of pieces of information to each of the plurality of UEs.

Optionally, the plurality of pieces of information may be used for receiving, by a UE, a ranging signal broadcast by another UE.

S303. In a case that a connection is not established between the control node and the plurality of UEs participating in positioning, the control node broadcasts an information set, where the information set includes the plurality of pieces of information.

The information set includes at least one of: a plurality of resources orthogonal to each other in time domain, a plurality of resources orthogonal to each other in frequency domain, a plurality of resources orthogonal to each other in code domain, or a plurality of resources orthogonal to each other in spatial domain.

Optionally, the information set is used for selecting, by the plurality of UEs participating in positioning, particular ranging resources/positioning resources.

According to the information configuration method provided in this embodiment of the present disclosure, the control node configures ranging resources, to enable the plurality of UEs participating in positioning to broadcast ranging signals or receive ranging signals, thereby implementing ranging/positioning between the UEs.

To schematically describe the present disclosure more clearly, such three ranging signal transmission manners as a broadcast manner, a unicast manner, and a multicast manner are exemplarily described below through Embodiment 1, Embodiment 2, and Embodiment 3 respectively.

Embodiment 1: Broadcast Manner

This embodiment of the present disclosure provides a ranging method. The method is applied to a first UE and a second UE. The ranging method may include the following S401 to S405.

S401. The first UE broadcasts a first signal.

A time at which the first signal is sent from the first UE is a first time.

For the description of the first signal, reference may be made to the related description in the foregoing embodiments, and details are not described herein again.

S402. The second UE receives the first signal.

The time at which the first signal reaches the second UE may be the fourth time, that is, the time at which the second UE receives the first signal may be the fourth time.

S403. The second UE broadcasts a second signal.

A time at which the second signal is sent from the second UE is a third time. A difference between the third time and the fourth time is a first time difference.

For the description of the second signal, reference may be made to the related description in the foregoing embodiments, and details are not described herein again.

S404. The first UE receives the second signal.

The time at which the second signal reaches the first UE may be the second time, that is, the time at which the first UE receives the second signal may be the second time.

S405. The first UE determines a distance between the first UE and the second UE according to the first time, the second time, and the first time difference.

According to the ranging method provided in this embodiment of the present disclosure, by broadcasting the first signal and receiving the second signal broadcast by the second UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

Optionally, after the foregoing S405, the ranging method provided in this embodiment of the present disclosure may further include the following S406 and S407.

S406. The first UE broadcasts a fifth signal.

S407. The second UE receives the fifth signal.

The fifth signal may carry at least one of target distance information or identifier information. The identifier information may include a first identifier and a second identifier. The target distance information may be used for indicating the distance between the first UE and the second UE.

Optionally, the first UE may broadcast the fifth signal in a beam sweeping manner.

According to the ranging method provided in this embodiment of the present disclosure, the first UE broadcasts the fifth signal, to enable the second UE receiving the fifth signal to obtain the distance between the second UE and the first UE.

Optionally, the foregoing S401 may be implemented through S401a, the foregoing S402 may be implemented through S402a, the foregoing S403 may be implemented through S403a, and the foregoing S404 may be implemented through S404a.

S401a. The first UE broadcasts a first signal according to first information.

The first information may be configuration information corresponding to the first UE.

For the description of the first information, reference may be made to the related description in the foregoing embodiments, and details are not described herein again.

S402a. The second UE receives the first signal according to the first information.

S403a. The second UE broadcasts a second signal according to second information.

The second information is configuration information corresponding to the second UE.

For the description of the second information, reference may be made to the related description in the foregoing embodiments, and details are not described herein again.

S404a. The first UE receives the second signal according to the second information.

According to the ranging method provided in this embodiment of the present disclosure, by configuring the first information and the second information, the UE is enabled to generate a signal used for ranging or receive a signal used for ranging. In this way, four receiving/sending times may be obtained by broadcasting the first signal, receiving the first signal, broadcasting the second signal, and receiving the second signal between the UEs, and therefore a distance between the UEs may be determined according to the four receiving/sending times, that is, positioning between the UEs is implemented.

Embodiment 2: Unicast Manner

This embodiment of the present disclosure provides a ranging method. The method is applied to a first UE and a second UE between which a sidelink connection is established. The ranging method may include the following S501 to S505.

S501. The first UE sends a first signal to the second UE.

A time at which the first signal is sent from the first UE may be a first time.

For the description of the first signal, reference may be made to the related description in the foregoing embodiments, and details are not described herein again.

S502. The second UE receives the first signal.

The time at which the first signal reaches the second UE may be the fourth time, that is, the time at which the second UE receives the first signal may be the fourth time.

S503. The second UE sends a second signal to the first UE.

A time at which the second signal is sent from the second UE may be a third time. A difference between the third time and the fourth time may be a first time difference.

For the description of the second signal, reference may be made to the related description in the foregoing embodiments, and details are not described herein again.

S504. The first UE receives the second signal.

The time at which the second signal reaches the first UE is the second time, that is, the time at which the first UE receives the second signal may be the second time.

S505. The first UE determines a distance between the first UE and the second UE according to the first time, the second time, and the first time difference.

According to the ranging method provided in this embodiment of the present disclosure, by sending the first signal to the second UE and receiving the second signal sent by the second UE to the first UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

Optionally, after the foregoing S505, the ranging method provided in this embodiment of the present disclosure may further include the following S506 and S507.

S506. The first UE sends a fifth signal to the second UE.

S507. The second UE receives the fifth signal.

The fifth signal may carry target distance information, a first identifier, and a second identifier. The target distance information may be used for indicating the distance between the first UE and the second UE.

According to the ranging method provided in this embodiment of the present disclosure, the first UE sends the fifth signal to the second UE, to enable the second UE receiving the fifth signal to obtain the distance between the second UE and the first UE.

Optionally, the foregoing S501 may be implemented through S501a, the foregoing S502 may be implemented through S502a, the foregoing S503 may be implemented through S503a, and the foregoing S504 may be implemented through S504a.

S501a. The first UE sends a first signal to the second UE according to first information.

The first information may be configuration information corresponding to the first UE.

For the description of the first information, reference may be made to the related description in the foregoing embodiments, and details are not described herein again.

S502a. The second UE receives the first signal according to the first information.

S503a. The second UE sends a second signal to the second UE according to second information.

The second information may be configuration information corresponding to the second UE.

For the description of the second information, reference may be made to the related description in the foregoing embodiments, and details are not described herein again.

S504a. The first UE receives the second signal according to the second information.

According to the ranging method provided in this embodiment of the present disclosure, by configuring the first information and the second information, the UE is enabled to generate a signal used for ranging or receive a signal used for ranging. In this way, four receiving/sending times may be obtained by sending the first signal to the second UE, receiving the first signal, sending the second signal to the first UE, and receiving the second signal between the UEs, and therefore a distance between the UEs may be determined according to the four receiving/sending times, that is, positioning between the UEs is implemented.

Embodiment 3: Multicast Manner

This embodiment of the present disclosure provides a ranging method. The method is applied to a first UE and a second UE. The ranging method may include the following S601 to S605.

S601. The first UE multicasts a first signal.

A time at which the first signal is sent from the first UE may be a first time.

Optionally, the first signal may further carry a group ID.

Optionally, the "sending, by the first UE, a third signal carrying a ranging request message" in the foregoing embodiment may include: multicasting, by the first UE, a third signal carrying a ranging request message. The third signal may further carry a group ID.

For the description of the first signal and the third signal, reference may be made to the related description in the foregoing embodiments, and details are not described herein again.

S602. The second UE receives the first signal.

The time at which the first signal reaches the second UE may be the fourth time, that is, the time at which the second UE receives the first signal may be the fourth time.

In this embodiment of the present disclosure, the second UE may obtain the time at which the first signal reaches the second UE, that is, the fourth time according to a measurement or demodulation result. If the second UE and the group ID meet any one of the situation 1 to the situation 4 in the foregoing embodiment, the second UE may continue to perform the following S603.

S603. The second UE multicasts a second signal.

A time at which the second signal is sent from the second UE may be a third time. A difference between the third time and the fourth time may be a first time difference.

Optionally, the second signal may further carry a group ID.

Optionally, the "sending, by the second UE, a fourth signal carrying a first time difference" in the foregoing embodiment may include: multicasting, by the second UE, the fourth signal carrying the first time difference. The fourth signal may further carry a group ID.

For the description of the second signal and the fourth signal, reference may be made to the related description in the foregoing embodiments, and details are not described herein again.

S604. The first UE receives the second signal.

The time at which the second signal reaches the first UE may be the second time, that is, the time at which the first UE receives the second signal may be the second time.

S605. The first UE determines a distance between the first UE and the second UE according to the first time, the second time, and the first time difference.

According to the ranging method provided in this embodiment of the present disclosure, by multicasting the first signal and receiving the second signal multicast by the second UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

Optionally, in a case that there is at least one second UE, after the foregoing S605, the ranging method provided in this embodiment of the present disclosure may further include the following S606 and S607.

S606. The first UE multicasts a fifth signal.

S607. The second UE receives the fifth signal.

The fifth signal may carry at least one set of information. Each set of information may include at least one of target distance information or identifier information. The identifier information may include a first identifier and a second identifier. The target distance information in each set of information may be used for indicating the distance between the first UE and the second UE.

Optionally, the fifth signal may further carry a group ID.

Optionally, the first UE may multicast the fifth signal in a beam sweeping manner.

According to the ranging method provided in this embodiment of the present disclosure, the first UE multicasts the fifth signal carrying at least one set of information, to enable the second UE receiving the fifth signal to obtain the distance between the second UE and the first UE.

Optionally, the foregoing S601 may be implemented through S601a, the foregoing S602 may be implemented through S602a, the foregoing S603 may be implemented through S603a, and the foregoing S604 may be implemented through S604a.

S601a. The first UE multicasts a first signal according to first information.

The first information may be configuration information corresponding to the first UE.

For the description of the first information, reference may be made to the related description in the foregoing embodiments, and details are not described herein again.

S602a. The second UE receives the first signal according to the first information.

S603a. The second UE multicasts a second signal according to second information.

The second information is configuration information corresponding to the second UE.

For the description of the second information, reference may be made to the related description in the foregoing embodiments, and details are not described herein again.

S604a. The first UE receives the second signal according to the second information.

According to the ranging method provided in this embodiment of the present disclosure, by configuring the first information and the second information, the UE is enabled to generate a signal used for ranging or receive a signal used for ranging. In this way, four receiving/sending times may be obtained by multicasting the first signal, receiving the first signal, multicasting the second signal, and receiving the second signal between the UEs, and therefore a distance between the UEs may be determined according to the four receiving/sending times, that is, positioning between the UEs is implemented.

It should be noted that, in this embodiment of the present disclosure, each ranging method shown in the foregoing accompanying drawings is exemplarily described with reference to one accompanying drawing in the embodiments of the present disclosure. During specific implementation, the ranging methods shown in the foregoing accompanying drawings may be further implemented with reference to any other combinable accompanying drawings schematically described in the foregoing embodiments, and details are not described herein again.

Figure 8:
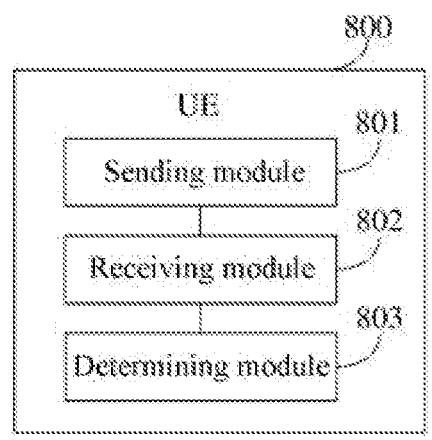
FIG. 8 is a first schematic structural diagram of a UE according to an embodiment of the present disclosure.

As shown in FIG. 8, an embodiment of the present disclosure provides a UE 800. The UE may be a first UE. The first UE may include a sending module 801, a receiving module 802, and a determining module 803. The sending module 801 is configured to send a first signal, where a time at which the first signal is sent from the first UE may be a first time. The receiving module 802 is configured to receive a second signal sent by a second UE, where a time at which the second signal reaches the first UE may be a second time. The determining module 803 is configured to determine a distance between the first UE and the second UE according to the first time, the second time, and a first time difference.

The first time difference may be a difference between a third time at which the second UE sends the second signal and a fourth time at which the second UE receives the first signal. The first time difference may be sent by the second UE to the first UE.

Optionally, the first signal may carry a ranging message. The ranging message may be used for obtaining a fourth time by the second UE, and requesting the second UE to send a second signal or send a second signal and a first time difference after receiving the first signal.

Optionally, the first signal may carry a ranging message and a ranging request message. The ranging message may be used for obtaining a fourth time by the second UE. The ranging request message may be used for requesting the second UE to send a second signal or send a second signal and a first time difference after receiving the first signal.

Optionally, the first signal may carry a ranging message. The ranging message may be used for obtaining a fourth time by the second UE. The sending module 801 may be further configured to send, after or before sending the first signal, a third signal carrying a ranging request message. The ranging request message may be used for requesting the second UE to send a second signal or send a second signal and a first time difference after receiving the first signal.

Optionally, the second signal may carry a ranging response message and the first time difference. The ranging response message may be used for obtaining the second time by the first UE.

Optionally, the second signal carries a ranging response message, and the ranging response message may be used for obtaining the second time by the first UE. The receiving module may be further configured to receive, before receiving the second signal sent by the second UE or after receiving the second signal sent by the second UE, a fourth signal carrying a first time difference from the second UE.

Optionally, the third signal may further carry a first identifier indicating the first UE.

Optionally, the fourth signal may further carry a first identifier indicating the first UE and a second identifier indicating the second UE.

Optionally, the first signal may carry a first identifier indicating the first UE.

Optionally, the second signal may carry a second identifier indicating the second UE or carry a first identifier indicating the first UE and a second identifier indicating the second UE.

Optionally, there may be at least one second UE. The sending module 801 may be further configured to send a fifth signal after the determining module 803 determines the distance between the first UE and the second UE. The fifth signal may carry at least one set of information, each set of information may include at least one of target distance information or identifier information, the identifier information may include the first identifier and the second identifier, and the target distance information in each set of information may be used for indicating a distance between the first UE and a second UE.

Optionally, the first identifier may include at least one of: an identifier of the first UE or a first resource identifier.

Optionally, the second identifier may include at least one of: an identifier of the second UE or a second resource identifier.

Optionally, the first identifier may be configured by a control node for the first UE, configured by the second UE for the first UE through signaling, preconfigured by a protocol or vendor, selected by the first UE from an information set, generated by the first UE according to higher layer information, or generated by the first UE according to an indication from the control node or a rule in a protocol. The information set may be broadcast or multicast by the control node, preconfigured by the control node, and/or predefined by a protocol.

Optionally, the second identifier may be configured by the control node for the second UE, configured by the first UE for the second UE through signaling, preconfigured by a protocol or vendor, selected by the second UE from the information set, generated by the second UE according to higher layer information, or generated by the second UE according to an indication from the control node or a rule in a protocol. The information set may be broadcast or multicast by the control node, preconfigured by the control node, and/or predefined by a protocol.

Optionally, the sending module 801 may be configured to send the first signal according to first information, where the first information may be configuration information corresponding to the first UE. The receiving module 802 may be configured to receive, according to second information, the second signal sent by the second UE, where the second information is configuration information corresponding to the second UE.

Optionally, the first information may include at least one of: first sequence information, first time frequency resource information, or a first resource identifier.

Optionally, the second information may include at least one of: second sequence information, second time frequency resource information, or a second resource identifier.

Optionally, the first information may be configured by a control node for the first UE through signaling, selected by the first UE from an information set, or configured by the second UE for the first UE through signaling. The information set may be broadcast or multicast by the control node, preconfigured by the control node, and/or predefined by a protocol.

Optionally, the second information may be configured by the control node for the second UE through signaling, selected by the second UE from the information set, or configured by the first UE for the second UE through signaling. The information set may be broadcast or multicast by the control node, preconfigured by the control node, and/or predefined by a protocol.

Optionally, the information set may include at least one of: a plurality of resources orthogonal to each other in time domain, a plurality of resources orthogonal to each other in frequency domain, a plurality of resources orthogonal to each other in code domain, or a plurality of resources orthogonal to each other in spatial domain.

Optionally, the receiving module 802 may be further configured to: before receiving the second signal sent by the second UE, receive the second information sent by the control node; or receive the second information sent by the second UE; or select the second information from an information set. The information set may be broadcast or multicast by the control node, preconfigured by the control node, and/or predefined by a protocol.

Optionally, a target time frequency resource may be a time frequency resource shared by a target signal and another signal or a channel; or a target time frequency resource is a time frequency resource dedicated to the target signal. The target time frequency resource may be a time frequency resource for transmitting the target signal, and the target signal may be the first signal or the second signal.

Optionally, the first signal may be a broadcast signal, a multicast signal, or a unicast signal, and the second signal may be a broadcast signal, a multicast signal, or a unicast signal.

The UE provided in this embodiment of the present disclosure can implement each process implemented by the first UE in the foregoing method embodiments. To avoid repetition, details are not described herein again.

An embodiment of the present disclosure provides a UE. The UE may be a first UE. By sending the first signal to the second UE and receiving the second signal sent by the second UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

Figure 9:
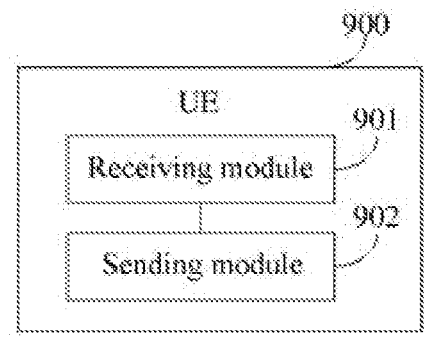
FIG. 9 is a second schematic structural diagram of a UE according to an embodiment of the present disclosure.

As shown in FIG. 9, an embodiment of the present disclosure provides a UE 900. The UE may be second UE. The second UE may include a receiving module 901 and a sending module 902. The receiving module 901 may be configured to receive a first signal sent by a first UE, where a time at which the first signal reaches the second UE may be a fourth time; and the sending module 902 may be configured to send a second signal, where a time at which the second signal is sent from the second UE is a third time, and a difference between the third time and the fourth time may be a first time difference.

The second signal may be used for determining a distance between the first UE and the second UE by the first UE according to a first time, a second time, and the first time difference. The first time may be a time at which the first signal is sent from the first UE. The second time may be a time at which the second signal reaches the first UE. The first time difference may be sent by the second UE to the first UE.

Optionally, the first signal may carry a ranging message. The ranging message may be used for obtaining a fourth time by the second UE, and requesting the second UE to send a second signal or send a second signal and a first time difference after receiving the first signal.

Optionally, the first signal may carry a ranging message and a ranging request message. The ranging message may be used for obtaining a fourth time by the second UE. The ranging request message may be used for requesting the second UE to send a second signal or send a second signal and a first time difference after receiving the first signal.

Optionally, the first signal may carry a ranging message, and the ranging message may be used for obtaining the fourth time by the second UE. The receiving module 901 may be further configured to receive, after receiving the first signal sent by the first UE, a third signal carrying a ranging request message. The ranging request message may be used for requesting the second UE to send a second signal or send a second signal and a first time difference after receiving the first signal.

Optionally, the second signal may carry a ranging response message and the first time difference. The ranging response message may be used for obtaining the second time by the first UE.

Optionally, the second signal may carry a ranging response message, and the ranging response message may be used for obtaining the second time by the first UE. The sending module 902 may be further configured to send, before sending the second signal or after sending the second signal, a fourth signal carrying the first time difference.

Optionally, the third signal may further carry a first identifier indicating the first UE.

Optionally, the fourth signal may further carry a first identifier indicating the first UE and a second identifier indicating the second UE.

Optionally, the first signal may carry a first identifier indicating the first UE.

Optionally, the second signal may carry a second identifier indicating the second UE or carry a first identifier indicating the first UE and a second identifier indicating the second UE.

Optionally, there is at least one second UE. The receiving module 901 may be further configured to receive, after the sending module 902 sends the second signal, a fifth signal sent by the first UE. The fifth signal may include at least one set of information, each set of information may include at least one of target distance information or identifier information, the identifier information may include the first identifier and the second identifier, and the target distance information in each set of information may be used for indicating a distance between the first UE and a second UE.

Optionally, the first identifier may include at least one of: an identifier of the first UE or a first resource identifier.

Optionally, the second identifier may include at least one of: an identifier of the second UE or a second resource identifier.

Optionally, the first identifier may be configured by a control node for the first UE, configured by the second UE for the first UE through signaling, preconfigured by a protocol or vendor, selected by the first UE from an information set, generated by the first UE according to higher layer information, or generated by the first UE according to an indication from the control node or a rule in a protocol. The information set may be broadcast or multicast by the control node, preconfigured by the control node, and/or predefined by a protocol.

Optionally, the second identifier may be configured by the control node for the second UE, configured by the first UE for the second UE through signaling, preconfigured by a protocol or vendor, selected by the second UE from the information set, generated by the second UE according to higher layer information, or generated by the second UE according to an indication from the control node or a rule in a protocol. The information set may be broadcast or multicast by the control node, preconfigured by the control node, and/or predefined by a protocol.

Optionally, the receiving module 901 may be configured to receive, according to first information, the first signal sent by the first UE. The first information may be configuration information corresponding to the first UE or configuration information corresponding to a plurality of UEs, and the plurality of UEs may include the first UE.

Optionally, the sending module 902 may be configured to send the second signal according to second information. The second information may be configuration information corresponding to the second UE.

Optionally, the first information may include at least one of: first sequence information, first time frequency resource information, or a first resource identifier.

Optionally, the second information may include at least one of: second sequence information, second time frequency resource information, or a second resource identifier.

Optionally, the first information may be configured by a control node for the first UE through signaling, selected by the first UE from an information set, or configured by the second UE for the first UE through signaling. The information set may be broadcast or multicast by the control node, preconfigured by the control node, and/or predefined by a protocol.

Optionally, the second information may be configured by the control node for the second UE through signaling, selected by the second UE from the information set, or configured by the first UE for the second UE through signaling. The information set may be broadcast or multicast by the control node, preconfigured by the control node, and/or predefined by a protocol.

Optionally, the information set may include at least one of: a plurality of resources orthogonal to each other in time domain, a plurality of resources orthogonal to each other in frequency domain, a plurality of resources orthogonal to each other in code domain, or a plurality of resources orthogonal to each other in spatial domain.

Optionally, the sending module 902 may be further configured to send, before sending the second signal, the second information to the first UE.

Optionally, a target time frequency resource may be a time frequency resource shared by a target signal and another signal or a channel; or a target time frequency resource may be a time frequency resource dedicated to the target signal. The target time frequency resource may be a time frequency resource for transmitting the target signal, and the target signal may be the first signal or the second signal.

Optionally, the first signal may be a broadcast signal, a multicast signal, or a unicast signal.

Optionally, the second signal may be a broadcast signal, a multicast signal, or a unicast signal.

The UE provided in this embodiment of the present disclosure can implement each process implemented by the second UE in the foregoing method embodiments. To avoid repetition, details are not described herein again.

An embodiment of the present disclosure provides a UE. The UE may be second UE. The second UE may obtain the time at which the first signal reaches the second UE and the time at which the second UE sends the second signal. Therefore, the second UE may obtain a difference between the two times and send the difference to the first UE, to enable the first UE to measure the distance between the first UE and the second UE according to the difference, the time at which the first signal is sent from the first UE, and the time at which the second signal reaches the first UE.

Figure 10:
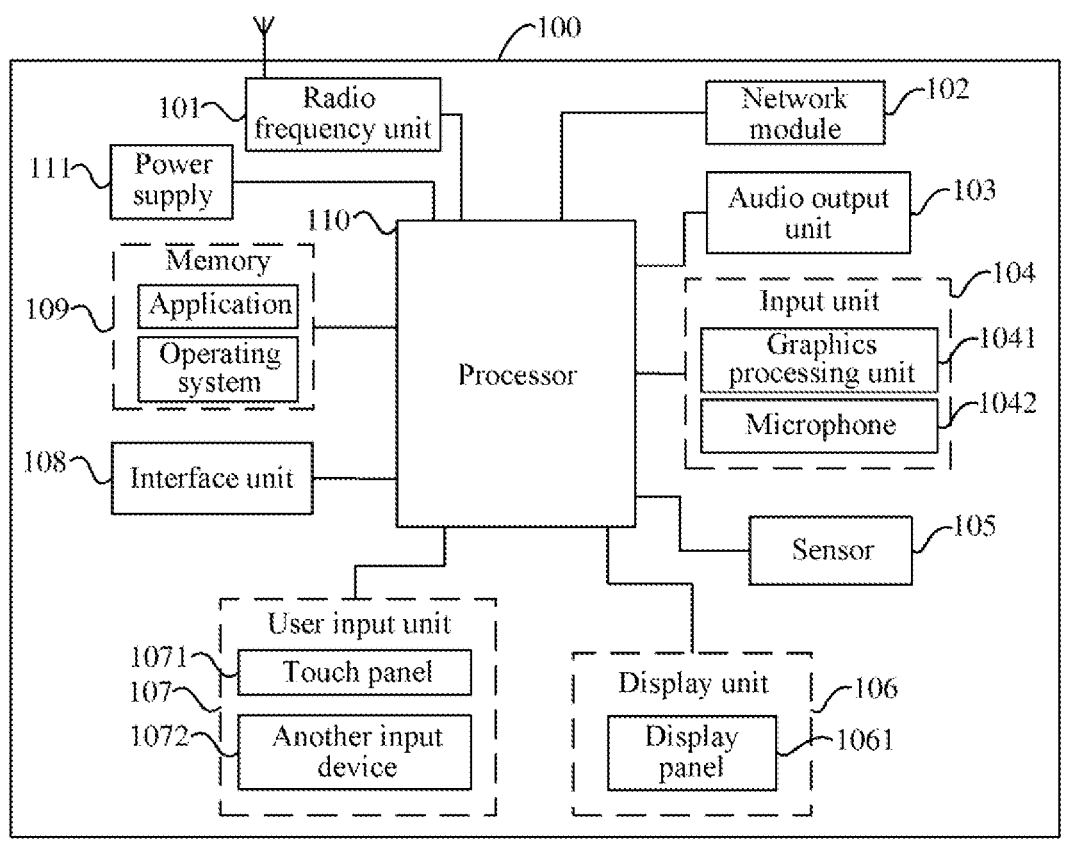
FIG. 10 is a schematic diagram of hardware of a UE according to an embodiment of the present disclosure.

FIG. 10 is a schematic structural diagram of hardware of a UE implementing each embodiment of the present disclosure. As shown in FIG. 10, the UE 100 includes, but not limited to: components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that, a structure of the UE shown in FIG. 10 does not constitute a limitation to the UE, and the UE may include more or fewer components than those shown in the figure, or some components may be combined, or a different component deployment may be used. In the embodiments of the present disclosure, the UE includes, but not limited to, a mobile phone, a tablet computer, a notebook computer, a palmtop computer, a wearable device, and a pedometer.

In a first possible implementation, the UE 100 shown in FIG. 10 is first UE.

The radio frequency unit 101 may be configured to send a first signal, where a time at which the first signal is sent from the first UE may be a first time; and receive a second signal sent by a second UE, where a time at which the second signal reaches the first UE may be a second time.

The processor 110 may be configured to determine a distance between the first UE and the second UE according to the first time, the second time, and a first time difference.

The second signal may be used for determining a distance between the first UE and the second UE by the first UE according to a first time, a second time, and the first time difference. The first time may be a time at which the first signal is sent from the first UE. The second time may be a time at which the second signal reaches the first UE. The first time difference may be sent by the second UE to the first UE.

An embodiment of the present disclosure provides a UE. The UE may be first UE. By sending the first signal to the second UE and receiving the second signal sent by the second UE, the first UE may obtain the time at which the first signal is sent from the first UE, the time at which the first signal reaches the second UE, the time at which the second signal is sent from the second UE, and the time at which the second signal reaches the first UE. In this way, the first UE may measure the distance between the first UE and the second UE according to the four times, for example, may measure a distance between a vehicle and another vehicle, between a vehicle and a pedestrian, or between a vehicle and another object, thereby preventing a transportation accident from occurring.

In a second possible implementation, the UE 100 shown in FIG. 10 is a second UE.

The radio frequency unit 101 may be configured to receive a first signal sent by first UE, where a time at which the first signal reaches the second UE may be a fourth time; and send a second signal, where a time at which the second signal is sent from the second UE may be a third time, and a difference between the third time and the fourth time may be a first time difference.

The second signal may be used for determining a distance between the first UE and the second UE by the first UE according to a first time, a second time, and the first time difference. The first time may be a time at which the first signal is sent from the first UE. The second time may be a time at which the second signal reaches the first UE. The first time difference may be sent by the second UE to the first UE.

An embodiment of the present disclosure provides a UE. The UE may be second UE. The second UE may obtain the time at which the first signal reaches the second UE and the time at which the second UE sends the second signal. Therefore, the second UE may obtain a difference between the two times and send the difference to the first UE, to enable the first UE to measure the distance between the first UE and the second UE according to the difference, the time at which the first signal is sent from the first UE, and the time at which the second signal reaches the first UE.

It should be understood that, in this embodiment of the present disclosure, the radio frequency unit 101 may be configured to receive and transmit a signal in an information receiving and transmission process or a call process, and for example, after receiving downlink data from a base station, transmit the downlink data to the processor 110 for processing; and further transmit uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with a network device and another device through a wireless communication system.

The UE 100 may provide wireless broadband Internet access for the user by using the network module 102, for example, help a user to receive and send an email, browse a webpage, and access stream media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal reception sound or a message reception sound) related to a specific function performed by the UE 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a still picture or a video obtained by an image capture apparatus (for example, a camera) in a video capture mode or an image capture mode. A processed image frame may be displayed on the display unit 106. An image frame processed by the graphics processing unit 1041 may be stored in the memory 109 (or other storage media) or sent by the radio frequency unit 101 or the network module 102. The microphone 1042 can receive a sound and can process the sound into audio data. The processed audio data can be converted into a format that can be sent to a mobile communication base station through the radio frequency unit 101 in a telephone call mode, for outputting.

The UE 100 further includes at least one sensor 105 such as an optical sensor, a motion sensor, and other sensors. Exemplarily, the optical sensor includes an ambient light sensor and a proximity sensor. The ambient light sensor may adjust luminance of the display panel 1061 according to brightness of the ambient light. The proximity sensor may switch off the display panel 1061 and/or backlight when the UE 100 is moved to the ear. As one type of the motion sensor, an accelerometer sensor may detect a magnitude of acceleration in various directions (generally three axes), and may detect a magnitude and a direction of gravity when static, which may be configured to recognize a posture of the mobile terminal (such as horizontal and vertical screen switching, related games, and magnetometer posture calibration), vibration recognition related functions (such as pedometer and tap), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein again.

The display unit 106 is configured to display information inputted by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate a key signal input related to the user setting and function control of the UE 100. Exemplarily, the user input unit 107 includes a touch panel 1071 and another input device 1072. The touch panel 1071, also referred to as a touchscreen, may collect a touch operation of a user on or near the touch panel (such as an operation of a user on the touch panel 1071 or near the touch panel 1071 by using any suitable object, such as a finger or a touch pen). The touch panel 1071 may include two parts: a touch detection apparatus and a touch controller. The touch detection apparatus detects a touch orientation of the user, detects a signal brought through the touch operation, and transmits the signal to the touch controller. The touch controller receives touch information from the touch detection apparatus, converts the touch information into a contact coordinate, then transmits the contact coordinate to the processor 110, receives and executes a command transmitted by the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Exemplarily, the another input device 1072 may include, but is not limited to, a physical keyboard, a functional key (for example, a volume control key or a switch key), a track ball, a mouse, and a joystick, and details are not described herein again.

Optionally, the touch panel 1071 may cover the display panel 1061. After detecting a touch operation on or near the touch panel 1071, the touch panel transfers the touch operation to the processor 110, to determine a type of a touch event. Then, the processor 110 provides a corresponding visual output on the display panel 1061 according to the type of the touch event. In FIG. 10, the touch panel 1071 and the display panel 1061 implement, as two independent parts, input and output functions of the UE 100. However, in some embodiments, the touch panel 1071 and the display panel 1061 may be integrated to implement the input and output functions of the UE 100, which is not specifically limited herein.

The interface unit 108 is an interface by which an external apparatus and the UE 100 are connected. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 108 may be configured to receive an input (for example, data information or power) from the external apparatus and transmit the received input to one or more elements within the UE 100, or may be configured to transmit data between the UE 100 and the external apparatus.

The memory 109 may be configured to store a software program and various data. The memory 109 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory device or other non-volatile solid state storage devices.

The processor 110 is the control center of the UE 100, and is connected to various parts of the UE 100 by using various interfaces and lines. By running or executing the software program and/or module stored in the memory 109, and invoking data stored in the memory 109, the processor performs various functions and data processing of the UE 100, thereby performing overall monitoring on the UE 100. The processor 110 may include one or more processing units. Optionally, the processor 110 may integrate an application processor and a modem. The application processor mainly processes an operating system, a user interface, an application, and the like. The modem mainly processes wireless communication. It may be understood that the modem processor may either not be integrated into the processor 110.

The UE 100 may further include the power supply 111 (such as a battery) for supplying power to the components. Optionally, the power supply 111 may be logically connected to the processor 110 by using a power management system, thereby implementing functions such as charging, discharging and power consumption management by using the power management system. In addition, the UE 100 includes some functional modules that are not shown. Details are not described herein again.

Optionally, an embodiment of the present disclosure further provides a UE, including the processor 110 and the memory 109 that are shown in shown in FIG. 10, and a computer program stored in the memory 109 and runnable on the processor 110. The computer program, when being executed by the processor 110, implements each process of the foregoing method embodiments, and can achieve the same technical effect. To avoid repetition, details are not described herein again.

An embodiment of the present disclosure further provides a non-transitory computer-readable storage medium. The non-transitory computer-readable storage medium stores a computer program. The computer program, when being executed by the processor 110 shown in FIG. 10, implements each process of the foregoing method embodiments, and can achieve the same technical effect. To avoid repetition, details are not described herein again. The non-transitory computer-readable storage medium is, for example, a read-only memory (ROM), a random access memory (RAM), a magnetic disk, or an optical disc.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such understanding, the technical solutions of the present disclosure or a part thereof that makes a contribution to the prior art may be essentially embodied in a form of a software product. The computer software product is stored in a storage medium (such as a ROM/RAM, a disk, and an optical disk), including several instructions to enable one terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A ranging method, performed by a first user equipment (UE) and comprising:
   sending a first signal, wherein a time at which the first signal is sent from the first UE is a first time;
   receiving a second signal sent by a second UE, wherein a time at which the second signal reaches the first UE is a second time; and
   determining a distance between the first UE and the second UE according to the first time, the second time, and a first time difference, wherein
   the first time difference is a difference between a third time at which the second UE sends the second signal and a fourth time at which the second UE receives the first signal, and the first time difference is sent by the second UE to the first UE; wherein
   the first signal carries a ranging message and a ranging request message; the ranging message is used for obtaining the fourth time by the second UE, and the ranging request message is used for requesting the second UE to send the second signal after receiving the first signal.

2. The method according to claim 1, wherein the method further comprises:
   sending a third signal carrying a ranging request message, wherein the ranging request message is used for requesting the second UE to send the second signal or send the second signal and the first time difference after receiving the first signal.

3. The method according to claim 1, wherein the second signal carries a ranging response message and the first time difference, and the ranging response message is used for obtaining the second time by the first UE; or the second signal carries a ranging response message, and the ranging response message is used for obtaining the second time by the first UE.

4. The method according to claim 1, wherein the method further comprises:
   receiving a fourth signal carrying the first time difference from the second UE.

5. The method according to claim 1, wherein the first signal carries a first identifier indicating the first UE; and
   the second signal carries a second identifier indicating the second UE or carries the first identifier indicating the first UE and the second identifier indicating the second UE.

6. The method according to claim 5, wherein there is at least one second UE; and
   after the determining a distance between the first UE and the second UE, the method further comprises:
   sending a fifth signal, wherein the fifth signal carries at least one set of information, each set of information comprises at least one of target distance information or identifier information, the identifier information comprises the first identifier and the second identifier, and the target distance information in each set of information is used for indicating a distance between the first UE and a second UE.

7. The method according to claim 5, wherein the first identifier comprises at least one of: an identifier of the first UE or a first resource identifier;
   the second identifier comprises at least one of: an identifier of the second UE or a second resource identifier;
   the first identifier is configured by a control node for the first UE, configured by the second UE for the first UE through signaling, preconfigured by a protocol or vendor, selected by the first UE from an information set, generated by the first UE according to higher layer information, or generated by the first UE according to an indication from the control node or a rule in a protocol; and
   the second identifier is configured by the control node for the second UE, configured by the first UE for the second UE through signaling, preconfigured by a protocol or vendor, selected by the second UE from the information set, generated by the second UE according to higher layer information, or generated by the second UE according to an indication from the control node or a rule in a protocol, wherein
   the information set is broadcast or multicast by the control node, preconfigured by the control node, and/or predefined by a protocol.

8. The method according to claim 1, wherein the sending a first signal comprises: sending the first signal according to first information, wherein the first information is configuration information corresponding to the first UE; and
   the receiving a second signal sent by a second UE comprises:
   receiving, according to second information, the second signal sent by the second UE, wherein the second information is configuration information corresponding to the second UE.

9. The method according to claim 8, wherein the first information comprises at least one of: first sequence information, first time frequency resource information, or a first resource identifier;
   the second information comprises at least one of: second sequence information, second time frequency resource information, or a second resource identifier;

the first information is configured by a control node for the first UE through signaling, selected by the first UE from an information set, or configured by the second UE for the first UE through signaling; and the second information is configured by the control node for the second UE through signaling, selected by the second UE from the information set, or configured by the first UE for the second UE through signaling, wherein the information set is broadcast or multicast by the control node, preconfigured by the control node, and/or predefined by a protocol.

10. The method according to claim 8, wherein before the receiving, according to second information, the second signal sent by the second UE, the method further comprises:

receiving the second information sent by a control node; or receiving the second information sent by the second UE; or selecting the second information from an information set, wherein the information set is broadcast or multicast by the control node, preconfigured by the control node, and/or predefined by a protocol.

11. A second user equipment (UE), comprising a processor, a memory, and a computer program stored in the memory and executable on the processor, wherein the computer program, when executed by the processor, causes the second UE to perform:

receiving a first signal sent by a first UE, wherein a time at which the first signal reaches the second UE is a fourth time; and sending a second signal, wherein a time at which the second signal is sent from the second UE is a third time, and a difference between the third time and the fourth time is a first time difference, wherein the second signal is used for determining a distance between the first UE and the second UE by the first UE according to a first time, a second time, and the first time difference; and the first time is a time at which the first signal is sent from the first UE, the second time is a time at which the second signal reaches the first UE, and the first time difference is sent by the second UE to the first UE; wherein the first signal carries a ranging message and a ranging request message; the ranging message is used for obtaining the fourth time by the second UE, and the ranging request message is used for requesting the second UE to send the second signal after receiving the first signal.

12. The second UE according to claim 11, wherein the computer program, when executed by the processor, causes the second UE to further perform:

receiving a third signal carrying a ranging request message, wherein the ranging request message is used for requesting the second UE to send the second signal or send the second signal and the first time difference after receiving the first signal.

13. The second UE according to claim 11, wherein the second signal carries a ranging response message and the first time difference, and the ranging response message is used for obtaining the second time by the first UE; or the second signal carries a ranging response message, and the ranging response message is used for obtaining the second time by the first UE.

14. The second UE according to claim 11, wherein the computer program, when executed by the processor, causes the second UE to further perform:

sending a fourth signal carrying the first time difference.

15. The second UE according to claim 11, wherein the first signal carries a first identifier indicating the first UE; and the second signal carries a second identifier indicating the second UE or carries the first identifier indicating the first UE and the second identifier indicating the second UE.

16. The second UE according to claim 11, wherein the computer program, when executed by the processor, causes the second UE to further perform:

receiving a fifth signal sent by the first UE, wherein the fifth signal comprises at least one set of information, each set of information comprises at least one of target distance information or identifier information, the identifier information comprises the first identifier and the second identifier, and the target distance information in each set of information is used for indicating a distance between the first UE and a second UE.

17. The second UE according to claim 11, wherein the computer program, when executed by the processor, causes the second UE to further perform:

receiving, according to first information, the first signal sent by the first UE, wherein the first information is configuration information corresponding to the first UE or configuration information corresponding to a plurality of UEs, and the plurality of UEs comprise the first UE; and sending the second signal according to second information, wherein the second information is configuration information corresponding to the second UE.

18. A first user equipment (UE), comprising a processor, a memory, and a computer program stored in the memory and executable on the processor, wherein the computer program, when executed by the processor, causes the first UE to perform:

sending a first signal, wherein a time at which the first signal is sent from the first UE is a first time;

receiving a second signal sent by a second UE, wherein a time at which the second signal reaches the first UE is a second time; and determining a distance between the first UE and the second UE according to the first time, the second time, and a first time difference, wherein the first time difference is a difference between a third time at which the second UE sends the second signal and a fourth time at which the second UE receives the first signal, and the first time difference is sent by the second UE to the first UE; wherein the first signal carries a ranging message and a ranging request message; the ranging message is used for obtaining the fourth time by the second UE, and the ranging request message is used for requesting the second UE to send the second signal after receiving the first signal.

19. The first user equipment according to claim 18, wherein the computer program, when executed by the processor, causes the first UE to further perform:

sending a third signal carrying a ranging request message, wherein the ranging request message is used for requesting the second UE to send the second signal or send the second signal and the first time difference after receiving the first signal.

20. The first user equipment according to claim 18, wherein the second signal carries a ranging response message and the first time difference, and the ranging response message is used for obtaining the second time by the first UE; or the second signal carries a ranging response message, and the ranging response message is used for obtaining the second time by the first UE.

* * * * *